US010362506B2

(12) United States Patent
Uchida et al.

(10) Patent No.: US 10,362,506 B2
(45) Date of Patent: Jul. 23, 2019

(54) COMMUNICATION AGGREGATION SYSTEM, CONTROL DEVICE, PROCESSING LOAD CONTROL METHOD AND NON-TRANSITORY COMPUTER READABLE MEDIUM STORING PROGRAM

(71) Applicant: NEC CORPORATION, Tokyo (JP)

(72) Inventors: Norio Uchida, Tokyo (JP); Toru Yamada, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 145 days.

(21) Appl. No.: 15/516,963

(22) PCT Filed: Jul. 30, 2015

(86) PCT No.: PCT/JP2015/003832
§ 371 (c)(1),
(2) Date: Apr. 5, 2017

(87) PCT Pub. No.: WO2016/056156
PCT Pub. Date: Apr. 14, 2016

(65) Prior Publication Data
US 2017/0295514 A1   Oct. 12, 2017

(30) Foreign Application Priority Data

Oct. 7, 2014   (JP) .................................. 2014-206187

(51) Int. Cl.
*H04W 4/08* (2009.01)
*H04W 4/38* (2018.01)
(Continued)

(52) U.S. Cl.
CPC ......... *H04W 28/0215* (2013.01); *H04L 12/66* (2013.01); *H04L 43/16* (2013.01);
(Continued)

(58) Field of Classification Search
CPC ....... H04L 12/66; H04L 43/16; H04L 47/125; H04L 67/1008; H04W 28/0215;
(Continued)

(56) References Cited

U.S. PATENT DOCUMENTS 7,203,183 B2 * 4/2007 Cromer ................. H04W 28/08
                                                              370/338
2005/0163045 A1 * 7/2005 Randriamasy .......... H04L 47/10
                                                              370/229
(Continued)

FOREIGN PATENT DOCUMENTS

EP    2547040 A1    1/2013
EP    2 713 634 A1  4/2014
(Continued)

OTHER PUBLICATIONS

Haruka Makie et al., "A Data Collection System by Sensor Networks for Disaster", Symposium on Multimedia, Distributed, Cooperative and Mobile Systems (DICOMO), 2004, pp. 555-558, vol. 2004, No. 7.
(Continued)

*Primary Examiner* — Kashif Siddiqui
(74) *Attorney, Agent, or Firm* — Sughrue Mion, PLLC

(57) ABSTRACT

A communication aggregation system according to an exemplary embodiment of the invention includes a plurality of devices (3) to (6) that transmit a larger amount of data when an abnormality is found compared with the amount of data transmitted in normal times, a gateway device (1) that communicates with devices included in a first group out of a plurality of devices, a gateway device (2) that communicates with devices included in a second group, and a control device (7) that, when the amount of data transmitted from some device increases due to detection of an abnormality and a difference in processing loads between the gateway devices exceeds a first threshold, changes a group to which
(Continued)

at least one device out of the plurality of devices (3) to (6) belongs so that a difference in the processing loads falls below a second threshold.

8 Claims, 12 Drawing Sheets

(51) Int. Cl.
    *H04W 4/60* (2018.01)
    *H04W 4/70* (2018.01)
    *H04L 12/26* (2006.01)
    *H04L 12/66* (2006.01)
    *H04L 29/08* (2006.01)
    *H04W 28/02* (2009.01)
    *H04W 28/08* (2009.01)
    *H04W 88/16* (2009.01)
    *H04L 12/803* (2013.01)

(52) U.S. Cl.
    CPC ........ *H04L 47/125* (2013.01); *H04L 67/1008* (2013.01); *H04W 4/08* (2013.01); *H04W 4/38* (2018.02); *H04W 4/60* (2018.02); *H04W 4/70* (2018.02); *H04W 28/08* (2013.01); *H04W 88/16* (2013.01)

(58) Field of Classification Search
    CPC ......... H04W 28/08; H04W 4/08; H04W 4/38; H04W 4/60; H04W 4/70; H04W 88/16
    See application file for complete search history.

(56) References Cited

U.S. PATENT DOCUMENTS

| | | | |
|---|---|---|---|
| 2011/0199905 A1* | 8/2011 | Pinheiro | H04W 28/0215 370/235 |
| 2012/0084568 A1* | 4/2012 | Sarikaya | H04L 9/3066 713/176 |
| 2012/0170451 A1* | 7/2012 | Viswanathan | H04W 4/70 370/230 |
| 2012/0231828 A1 | 9/2012 | Wang et al. | |
| 2012/0236712 A1* | 9/2012 | Park | H04W 36/22 370/230 |
| 2013/0083653 A1 | 4/2013 | Jain et al. | |
| 2013/0157653 A1* | 6/2013 | Huang | H04W 28/0215 455/423 |
| 2015/0055640 A1* | 2/2015 | Wang | H04W 60/00 370/338 |
| 2015/0358874 A1 | 12/2015 | Ahn et al. | |

FOREIGN PATENT DOCUMENTS

| | | |
|---|---|---|
| EP | 2945326 A1 | 11/2015 |
| JP | 2006-209465 A | 8/2006 |
| JP | 2009-218776 A | 9/2009 |
| JP | 2013-172179 A | 9/2013 |
| JP | 2014-36346 A | 2/2014 |
| WO | 2011116603 A1 | 9/2011 |
| WO | 2012/111255 A1 | 8/2012 |
| WO | 2014109597 A1 | 7/2014 |

OTHER PUBLICATIONS

Shinji Kitagami et al., "A Proxy Communication Method in Machine to Machine System to Enable the Device Connection to Different Multiple Services and its Implementation", IEEI Transactions on Electronics, Information and Systems, Apr. 2012, pp. 516-525, vol. 132, No. 4.

International Search Report for PCT/JP2015/003832 dated Oct. 20, 2015.

Communication dated Apr. 23, 2018, from the European Patent Office in counterpart European Application No. 15849066.4.

Notification of Reasons for Refusal dated Mar. 5, 2019 issued by the Japanese Patent Office in counterpart application No. 2016-552807.

* cited by examiner

US 10,362,506 B2

COMMUNICATION AGGREGATION SYSTEM, CONTROL DEVICE, PROCESSING LOAD CONTROL METHOD AND NON-TRANSITORY COMPUTER READABLE MEDIUM STORING PROGRAM

TECHNICAL FIELD

The present invention relates to a communication aggregation system, a control device, a processing load control method and a program and, particularly, to a communication aggregation system, a control device, a processing load control method and a program that control a plurality of devices.

BACKGROUND ART

Devices that are connected to a network autonomously transmit detected data to a server device or the like, and the server device or the like can thereby implement automatic data collection and device control. Such a service is called Machine-to-Machine (M2M), and the usability of the M2M has attracted attention recently.

As one example of M2M services, electricity meters of houses and buildings are connected to a network, and a server device or the like can thereby collect electricity consumption in real time. Using data collected in this way, a business operator that collects electricity consumption can provide a service to optimize the production of electricity or the like.

When expanding the use of M2M services, it is necessary to consider the case where a plurality of services or applications use data detected in the same device. In order to effectively implement such a case, it has been studied to place a common service control device that controls common functions to be used by a plurality of services and applications together and thereby promote the emergence of new services.

Further, a gateway device is used as a device to aggregate data detected by a large number of devices. The gateway device is typically placed between the common service control device and a plurality of devices.

When providing a service, a server device requests a large number of devices to transmit data. In response to the request for transmission of data, the large number of devices transmit data to the server device at the same time. At this time, each of the devices adds header information to data in order to transmit the data normally. Thus, because a large number of devices transmit data with header information, the network bandwidth usage rate increases. Further, because the server device receives data transmitted from a large number of devices, the processing load increases.

In order to solve the above problem, it has been studied to treat a plurality of devices as one group. For example, by treating a plurality of devices as one group, it is possible to tie data transmitted from a common group together and transmit them in a bundle. This reduces the frequency of data communication, and it is thereby possible to reduce the processing load in the server device.

As an example of treating a plurality of devices as one group, the operation of grouping devices with common characteristics together in the environment where different types of devices are placed is described in Patent Literature 1. For example, a structure that groups devices based on data type (camera data etc.) and a structure that groups movable equipment and fixed equipment into different groups are described therein.

CITATION LIST

Patent Literature

Patent Literature 1: International Patent Publication No. 2012/111255

SUMMARY OF INVENTION

Technical Problem

However, as disclosed in Patent Literature 1, if devices with common characteristics are grouped together, there is a problem that, when the data transmission frequency of a device that belongs to a certain group increases, only the load of a gateway device that receives data of that group increases. Because it cannot be known and can dynamically vary which gateway device is subject to an increase in load, all gateway devices need to be designed to be able to bear the highest possible processing load. However, at an arbitrary point of time, an increase in load is not observed except in this gateway device, and therefore there can be waste of throughput capacity in the whole system.

An exemplary object of the present invention is to provide a communication aggregation system, a control device, a processing load control method and a program that can (dynamically) level the load of a gateway device that communicates with a plurality of devices with another gateway device.

Solution to Problem

A communication aggregation system according to a first exemplary aspect of the invention includes a plurality of devices that transmit a larger amount of data when an abnormality is found compared with the amount of data transmitted in normal times, a first gateway device that communicates with devices included in a first group out of the plurality of devices; a second gateway device that communicates with devices included in a second group out of the plurality of devices, and a control means for, when the amount of data transmitted from some device out of the plurality of devices increases due to detection of an abnormality and a difference in processing loads between the first gateway device and the second gateway device exceeds a first threshold, changing a group to which at least one device out of the plurality of devices belongs so that a difference in the processing loads falls below a second threshold.

A control device according to a second exemplary aspect of the invention is a control device that connects a first gateway device that communicates with devices included in a first group out of a plurality of devices that transmit a larger amount of data when an abnormality is found compared with the amount of data transmitted in normal times and a second gateway device that communicates with devices included in a second group out of the plurality of devices, and the control device includes a gateway load acquisition unit that acquires load information from the first gateway device and the second gateway device; and a grouping determination unit that, when the amount of data transmitted from some device out of the plurality of devices increases due to detection of an abnormality and a difference in processing loads between the first gateway device and the second gateway device exceeds a first threshold, changes a group to which at least one device out of the plurality of devices belongs so that a difference in the processing loads falls below a second threshold.

A processing load control method according to a third exemplary aspect of the invention includes acquiring load information from a first gateway device that communicates with devices included in a first group out of a plurality of devices that transmit a larger amount of data when an abnormality is found compared with the amount of data transmitted in normal times and a second gateway device that communicates with devices included in a second group out of the plurality of devices; and when the amount of data transmitted from some device out of the plurality of devices increases due to detection of an abnormality and a difference in processing loads between the first gateway device and the second gateway device exceeds a first threshold, changing a group to which at least one device out of the plurality of devices belongs so that a difference in the processing loads falls below a second threshold.

A program according to a fourth exemplary aspect of the invention causes a computer to execute acquiring load information from a first gateway device that communicates with devices included in a first group out of a plurality of devices that transmit a larger amount of data when an abnormality is found compared with the amount of data transmitted in normal times and a second gateway device that communicates with devices included in a second group out of the plurality of devices; and when the amount of data transmitted from some device out of the plurality of devices increases due to detection of an abnormality and a difference in processing loads between the first gateway device and the second gateway device exceeds a first threshold, changing a group to which at least one device out of the plurality of devices belongs so that a difference in the processing loads falls below a second threshold.

Advantageous Effects of Invention

According to the exemplary aspects of the invention, it is possible to provide a communication aggregation system, a control device, a processing load control method and a program that can (dynamically) level the load of a gateway device that communicates with a plurality of devices with another gateway device. Further, by the leveling, it is possible to reduce the maximum value of throughput capacity which the gateway device needs to have.

DESCRIPTION OF EMBODIMENTS

First Exemplary Embodiment

Figure 1:
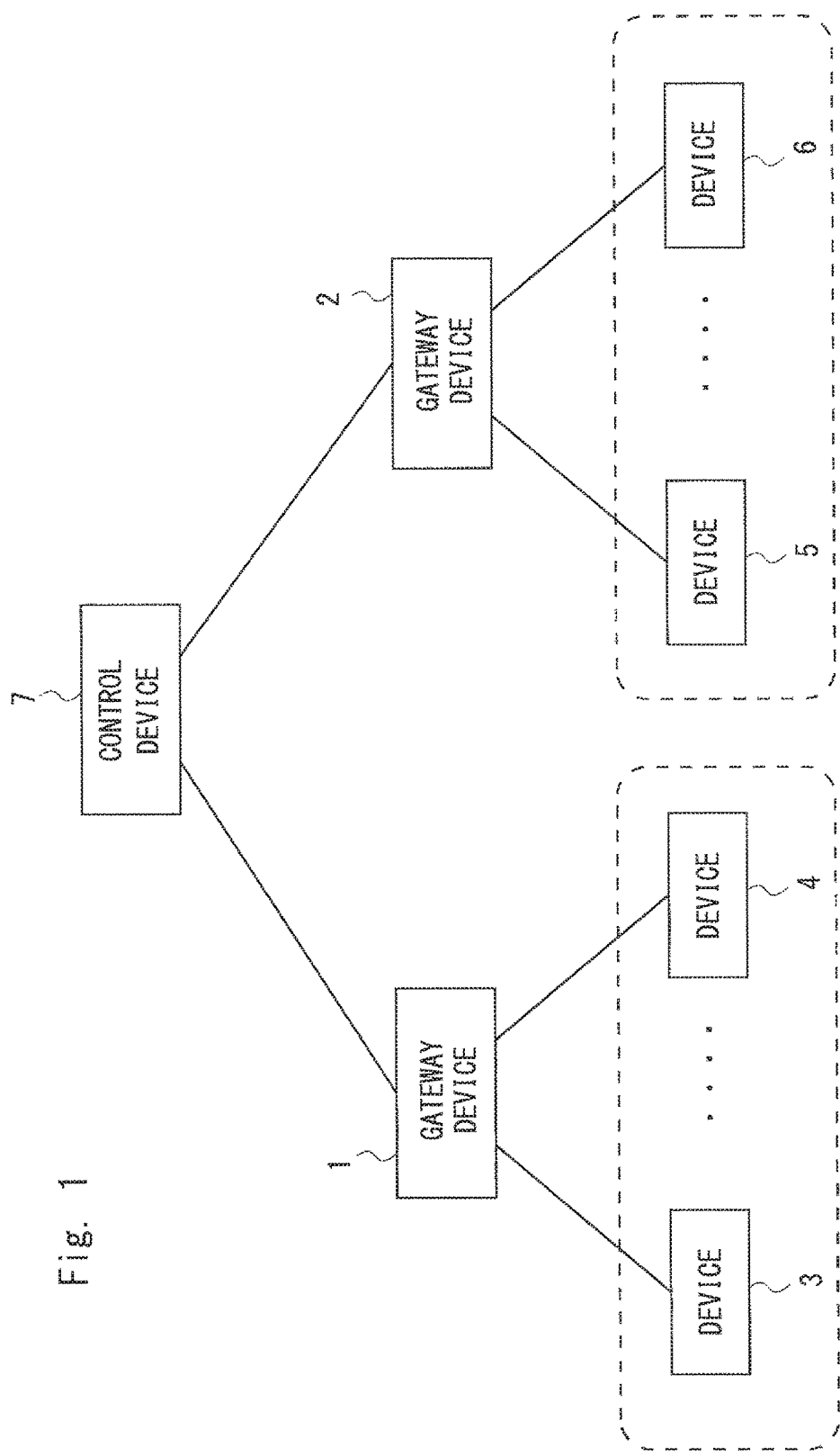
FIG. 1 is a block diagram of a communication aggregation system according to a first exemplary embodiment.

Exemplary embodiments of the present invention are described hereinafter with reference to the drawings. A communication aggregation system shown in FIG. 1 includes gateway devices 1 to 2, devices 3 to 6, and a control device 7.

The devices 3 to 6 are devices that transmit a larger amount of data when an abnormality is found compared with the amount of data transmitted in normal times. For example, the devices 3 to 6 measure and acquire information inside or close to the device, and transmit the acquired data to a server device or the like through the gateway device 1 or 2. The devices 3 to 6 may be a sensor device or an M2M terminal device used in M2M services. The sensor device may be a device that detects a change in the external environment such as vibration, temperature and humidity, for example. The M2M terminal device may be a communication device that transmits data autonomously without user operation, such as a communication device that autonomously transmits the sales of a vending machine to a server device, for example.

When an abnormality is found is when data indicating an exception which is different from normal times is found, and it may be when the temperature measured by the devices 3 to 6 exceeds a predetermined threshold, when the frequency of vibration detected by the devices 3 to 6 exceeds a predetermined threshold or the like. Normal times may be when numerical data measured or detected by the devices 3 to 6 is within a predetermined threshold or the like.

In normal times, the devices 3 to 6 transmit measured or detected data to a server device or the like through the gateway device at regular intervals, and when an abnormality is found, the devices 3 to 6 may carry out measurement or detection more frequently than in normal times and transmit measured or detected data to a server device or the like. Further, when an abnormality is found, the devices 3 to 6 may transmit more detailed data than in normal times to a server device or the like.

The gateway devices 1 and 2 relay communications between a plurality of devices and a server device or the like. In this figure, the gateway device 1 aggregates a plurality of devices including the devices 3 and 4, and the gateway device 2 aggregates a plurality of devices including the devices 5 and 6.

The gateway devices 1 and 2 may be a router device that controls communications mainly in an IP layer, a switch device that controls communications mainly in an MAC layer or the like. The gateway devices 1 and 2 may be a computer device that operates when a CPU (Central Processing Unit) executes a program stored in a memory.

The plurality of devices including the devices 3 and 4 form a first group, and the plurality of devices including the devices 5 and 6 form a second group. The gateway device 1 communicates with the devices that belong to the first group, and the gateway device 2 communicates with the devices that belong to the second group.

The gateway devices 1 and 2 communicate with the devices that belong to the first group or the devices that belong to the second group via a wireless channel. For example, when powered on, the devices 3 and 4 may make connection to the gateway device 1, which is predetermined as a device to which it is to be connected. Likewise, when powered on, the devices 5 and 6 may make connection to the gateway device 2, which is predetermined as a device to which it is to be connected. Further, the gateway devices 1 and 2 may communicate with the devices that belong to the first group or the devices that belong to the second group via a wired channel.

The control device 7 changes a group which devices belong to depending on a difference in the processing loads of the gateway devices 1 and 2. When an abnormality is found in some device out of a plurality of devices including the devices 3 to 6, the amount of data transmitted from the some device out of the plurality of devices including the devices 3 to 6 increases. Accordingly, the processing load of the gateway device that communicates with the device that transmits an increased amount of data increases.

When a difference in the processing loads between the gateway device 1 and the gateway device 2 exceeds a first threshold, the control device 7 changes a group which at least one device out of a plurality of devices belongs to so that a difference in the processing loads falls below a second threshold. For example, the control device 7 may change a group which the device belongs to so that the processing loads in the gateway device 1 and the gateway device 2 become substantially equal. "Substantially equal" does not necessarily means that the processing load of the gateway device 1 and the processing load of the gateway device 2 are exactly the same.

The processing load may be indicated using the amount of data transmitted to the gateway devices 1 and 2 from devices under them or using the frequency of data transmission from devices under them.

As described above, by using the communication aggregation system shown in FIG. 1, the control device 7 can change a group which a device belongs to when an abnormality is found in data measured or detected by a device and the amount of data transmitted from the device increases. It is thereby possible to reduce a difference in the processing loads between the gateway device 1 and the gateway device 2 and level the processing load of one gateway device with the processing load of the other gateway device.

Second Exemplary Embodiment

Figure 2:
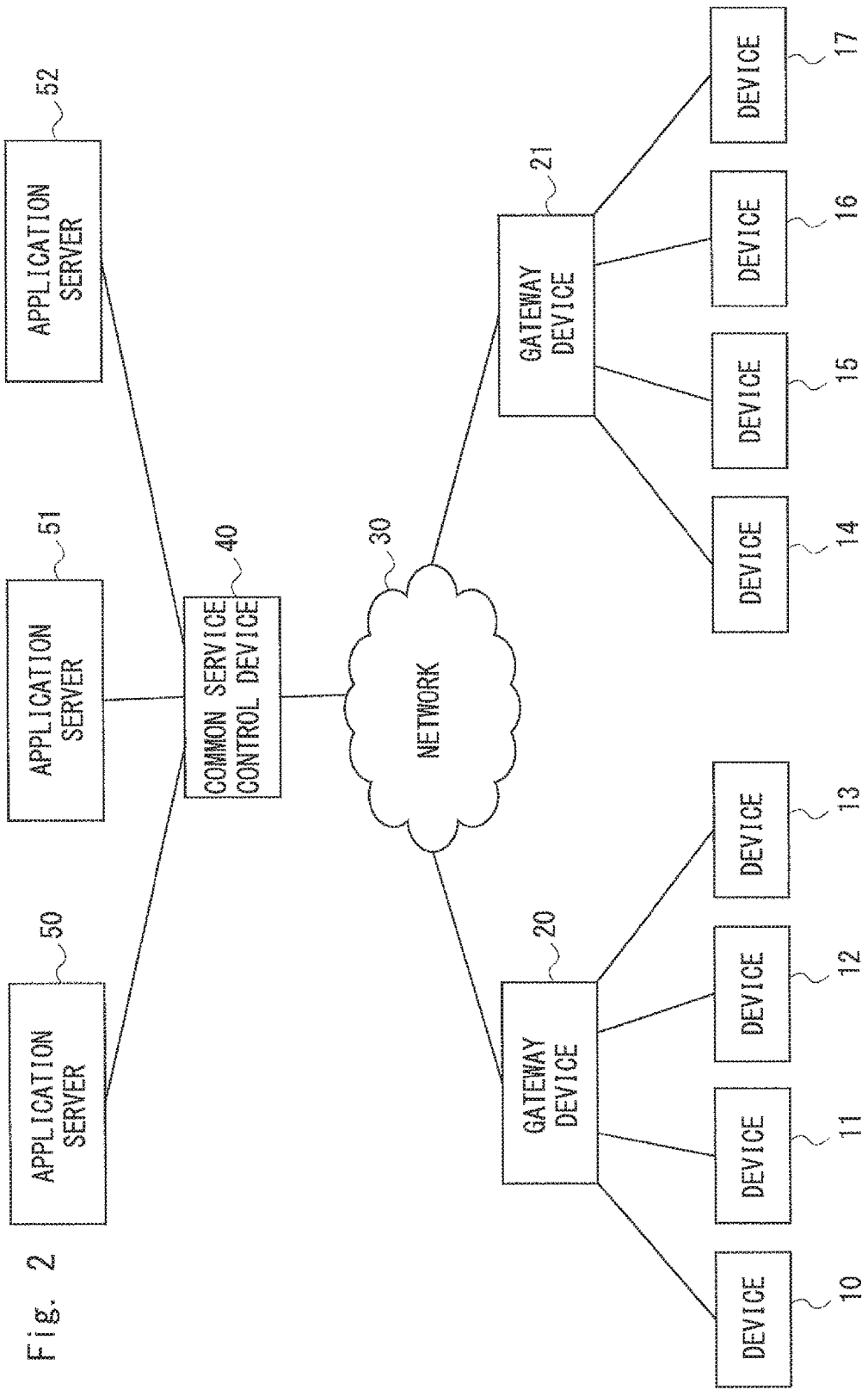
FIG. 2 is a block diagram of a communication aggregation system according to a second exemplary embodiment.

A configuration example of a communication aggregation system according to a second exemplary embodiment of the invention is described hereinafter with reference to FIG. 2. The communication aggregation system in FIG. 2 includes devices 10 to 17, a gateway device 20, a gateway device 21, a network 30, a common service control device 40, and application servers 50 to 52. Although three application servers 50 to 52 are included in the configuration shown in this figure, only one application server 50 may be included instead. Alternatively, two or more application servers may be included. As for the devices 10 to 17 also, more than eight or less than eight devices may be connected with the common service control device 40 through the gateway device.

The common service control device 40 is M2M platform, for example, and it may be M2M Service Infrastructure defined in oneM2M for the standardization of Machine to Machine services. The M2M Service Infrastructure corresponds to IN (Infrastructure Node) in the oneM2M architecture, and it has CSE (Common Services Entity) that provides CSF (Common Services Function) group defined by oneM2M. The common service control device 40 may be a device including a plurality of CSE. Note that the CSE in the IN is also called IN(Infrastructure Node)-CSE. The network 30 is a mobile communication network provided by a telecommunications carrier, for example, and it may be Underlying Network defined by oneM2M. The gateway devices 20 and 21 are mobile routers, for example, and they may be M2M Gateway defined by oneM2M. The M2M Gateway corresponds to MN (Middle Node) in the oneM2M architecture, and it has CSE. Note that the CSE in the MN is also called MN-CSE. Further, the devices 10 to 17 are sensor devices, for example, and they may be M2M Device defined by oneM2M. The M2M Device corresponds to ASN (Application Service Node) or ADN (Application Dedicated Node) in the oneM2M architecture, and the ASN has CSE. Note that the CSE in the ASN is also called ASN-CSE. Further, the application servers 50 to 52 are servers that process specific operations, for example, and they may be M2M Application Infrastructure defined by oneM2M. The application servers 50 to 52 may have AE (Application Entity) in the oneM2M architecture. Note that the AE that is in Infrastructure Domain defined by oneM2M and connected to IN-CSE is also called IN(Infrastructure Node)-AE.

The devices 10 to 17 are the same as the devices 3 to 6 in FIG. 1, and therefore detailed explanation thereof is omitted. Further, the gateway devices 20 and 21 are the same as the gateway devices 1 and 2 in FIG. 1, and therefore detailed explanation thereof is omitted.

The common service control device 40 collects the data generated in the devices 10 to 17. The common service control device 40 may be a platform to run software or a plurality of functions on the common service control device 40, and it may be referred to as a common service platform. The common service control device 40 may be a computer device such as a server device.

The application servers 50 to 52 share the data collected by the common service control device 40. The application servers 50 to 52 provide application services. When providing application services, the application servers 50 to 52 use the data which the common service control device 40 has collected from the devices 10 to 17. Sharing data among the application servers 50 to 52 means that the data collected from the same devices 10 to 17 can be used by each of the application servers 50 to 52.

The network 30 relays the data transmitted and received between the common service control device 40 and the gateway device 20 or the gateway device 21. The network 30 may be an IP network that communicates packet data or the like, and it may be a communication network managed by a telecommunications carrier, for example.

The gateway device 20 transmits the data transmitted from the devices 10 to 13 to the common service control device 40 through the network 30. The gateway device 21 transmits the data transmitted from the devices 14 to 17 to the common service control device 40 through the network 30.

As a specific example of the communication aggregation system, an abnormality detection system of a construction such as a bridge is described hereinafter with reference to FIG. 3. This system is a system that mounts a large number of devices (e.g., vibration sensors) on a construction such as a bridge and detects local abnormalities. A sufficient number of devices to detect abnormalities are placed in necessary places. The gateway device aggregates observation data of a plurality of devices and transmits it to the common service control device. The application server uses the observation data stored in the common service control device. The devices and the gateway device are connected by a specified radio system. Alternatively, the devices and the gateway device may be connected by a wired line. When a network between the gateway device and the application server is a circuit where charges vary depending on the amount of data such as a mobile telephone network, it is desirable to minimize the amount of data transmitted and received.

System requirements of such a construction diagnosis system are as follows. It is required to reduce the traffic as much as possible in normal times and, when an abnormality is found, monitor a device that has detected an abnormality and nearby devices that are likely to have a causal connection with that device in detail or at high frequency.

Figure 3:
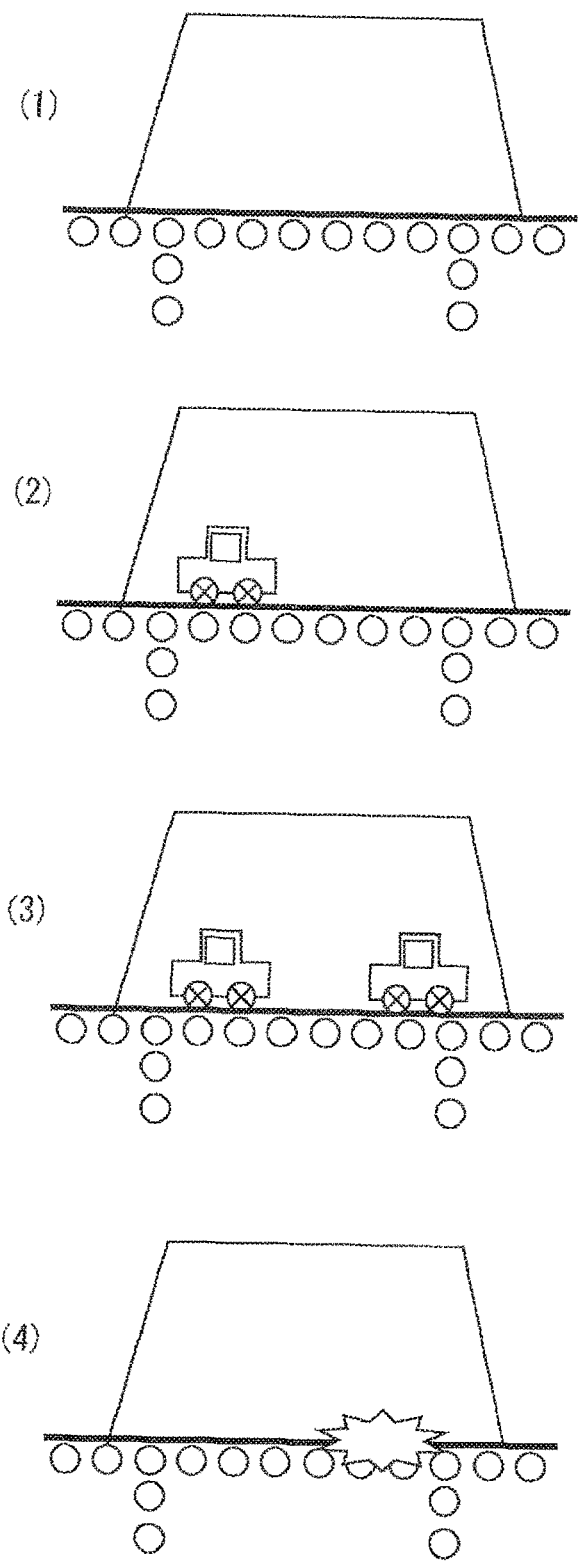
FIG. 3 is a view illustrating an abnormality detection system of a construction such as a bridge according to the second exemplary embodiment.

FIG. 3 shows the way a vehicle passes over a bridge. Circles below the bridge indicate devices. In FIG. 3, a sufficient number of devices are located below the bridge.

For example, in FIG. 3(1), there is no traffic on the bridge to be monitored, and all devices that detect abnormalities are in normal conditions. In FIG. 3(2), one vehicle is passing on a bridge, vibration increases at the place where the vehicle is running, the device placed in the part where the vehicle is running detects that vibration increases only at the timing when the vehicle passes. In FIG. 3(3), a plurality of vehicles are passing on a bridge, and vibration increases at the most part of the bridge. FIG. 3(4) shows the case where an abnormality occurs in the bridge. Because irregular vibration occurs at the place where the abnormality occurs, there arises a need to transmit data at high frequency near the place where the abnormality occurs and monitor them.

To satisfy the above-described system requirements, it is preferable to operate devices using a plurality of operating modes. One of the operating modes is normal observation mode and, in the normal observation mode, devices conduct measurement in a small dynamic range, with rough quantization accuracy, at a low measurement frequency and in a short time, for example, and use an algorithm with a high compression ratio when compressing data before transmission. The other operating mode is detailed observation mode and, in the detailed observation mode, devices conduct measurement in the state where at least one of measurement in a large dynamic range, with fine quantization accuracy, at a high measurement frequency and in a long time, and a low data compression ratio is satisfied. For example, it is assumed that the amount of data per unit time in the normal observation mode is 1, and the amount of data per unit time in the detailed observation mode is 10. In other words, the amount of data per unit time in the detailed observation mode is 10 times the amount of data per unit time in the normal observation mode. A difference in the amount of data is not limited to 10 times, and it may vary depending on the type of data to be transmitted or the like. The load of the gateway device is proportional to the amount of data to be processed. Further, the number of operating modes is not limited to two, and an operating mode with a larger amount of data than in the normal observation mode and a smaller amount of data than in the detailed observation mode may be further used. Alternatively, an operation mode that satisfies at least one of measurement in a larger dynamic range, with rougher quantization accuracy, at a lower measurement frequency and in a shorter time, and a lower data compression ratio than in the normal observation mode may be used.

When, in some device, a local abnormality or a sign of a local abnormality is detected from observation results in the normal observation mode, only that device and nearby devices are made to transition to the detailed observation mode. A correlation between a device i and a device j is indicated by s(i,j). The correlation is defined in advance from a physical distance and a degree of structural correlation between devices in a construction to be diagnosed. For example, devices mounted on the same pole have a high degree of correlation. Alternatively, a degree of correlation between devices may be derived from observation data in the normal observation mode.

When an abnormality is detected from data of the device i, the values of s(i,j) (j=1, 2, . . . , n (where n is a total number of devices) are arranged in descending order, and a specified number of devices (e.g., 5 devices) from the top are made to transition to the detailed observation mode. Because s(i,i) has the largest degree of correlation from the definition, the device i is always made to transition to the detailed observation mode. Although the simplest case is described above, another method may be used when selecting devices to transition to the detailed observation mode.

For example, in order to prevent biased placement of devices in the detailed observation mode, the distribution in the x axis, the y axis and the z axis is also taken into consideration in addition to the value of s(i,j), so that devices that transition to the detailed observation mode are not biased along one axis direction only.

Figure 4:
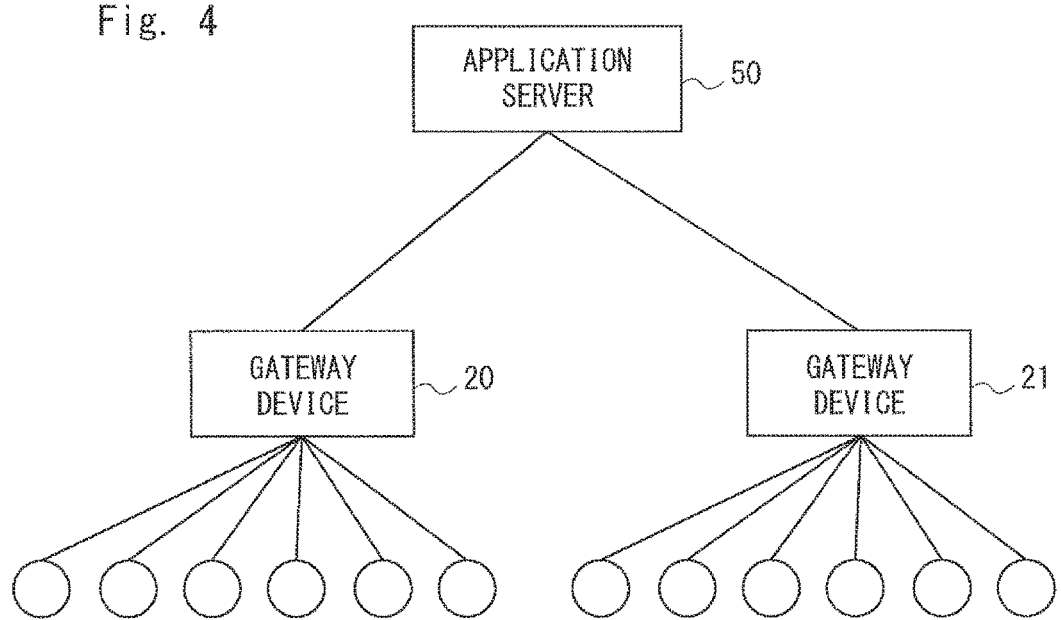
FIG. 4 is a view illustrating a change in a group according to the second exemplary embodiment.

In the above case, the configuration is as shown in FIG. 4 in normal times, and six devices are connected to each gateway device. Thus, the amount of data (processing load) processed by each gateway device per unit time is 6. The solid-line circles in FIG. 4 indicate devices that operate in the normal observation mode. On the other hand, when an abnormality is found shown in FIG. 5, five devices that are connected to each gateway device 21 enter the detailed observation mode, and therefore the processing load becomes unequal between the gateway device 20 and the gateway device 21. To be specific, while the processing load of the gateway device 20 remains 6, the processing load of the gateway device 21 becomes 51. The dotted-line circles in FIG. 5 indicate devices that operate in the detailed observation mode.

If the structure of devices and gateway devices (i.e., the structure of grouping of devices) is fixed, the maximum throughput capacity and the channel capacity of a gateway device on the assumption of the worst case where devices in the detailed observation mode are concentrated on a certain gateway device are required. In this case, the manufacturing cost of the gateway device increases.

Figure 5:
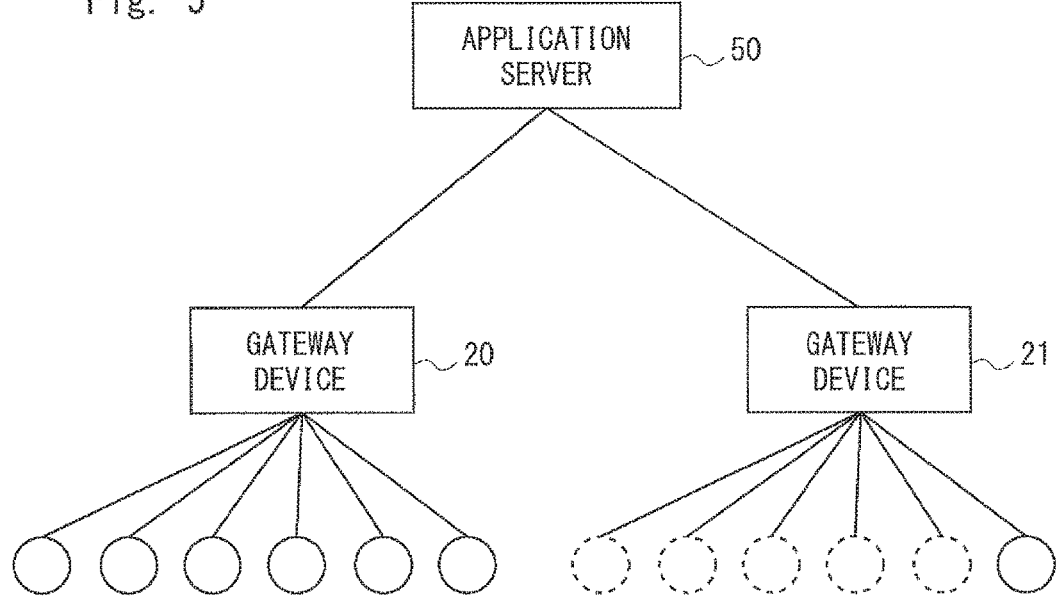
FIG. 5 is a view illustrating a change in a group according to the second exemplary embodiment.
Figure 6:
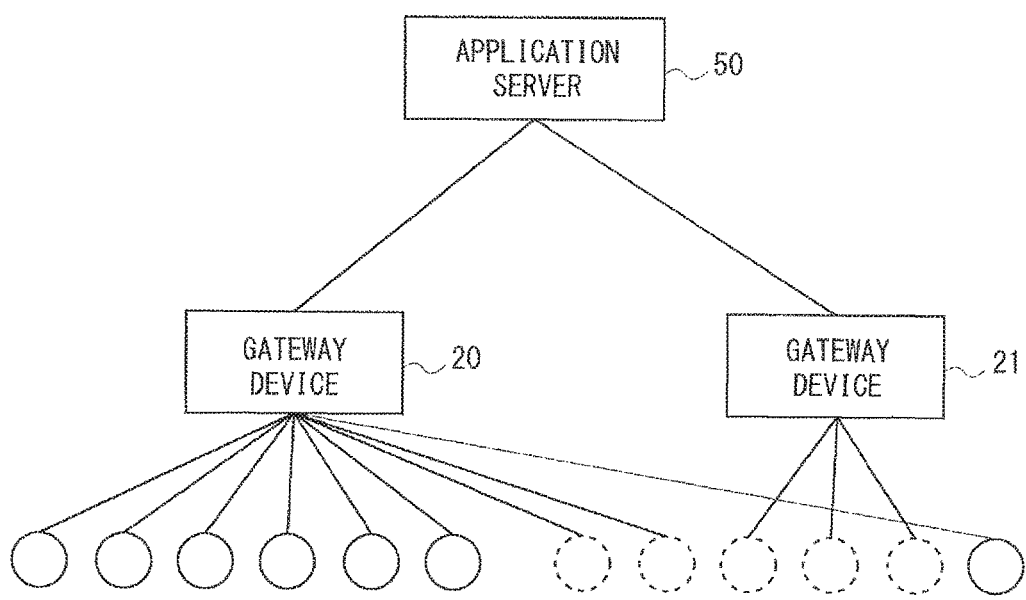
FIG. 6 is a view illustrating a change in a group according to the second exemplary embodiment.

In this exemplary embodiment, when the placement of devices that transition to the detailed observation mode is biased as shown in FIG. 5, the application server 50, the common service control device 40 or the like gives an instruction to regroup devices and thereby levels the load among a plurality of gateways. To be specific, as shown in FIG. 6, three devices that operate in the detailed observation mode are connected to the gateway device 20, and the remaining two devices that operate in the detailed observation mode remain to be connected to the gateway device 21. In FIG. 6, as a result of regrouping, the load of the gateway device 20 is 27, and the load of the gateway device 21 is 30.

In order to implement this operation, each gateway device needs to be placed in the position where each device can communicate with two or more gateway devices.

FIGS. 4 to 6 show that the application server 50 performs processing to level the load among a plurality of gateway devices. Note that, to simplify the drawings, the common service control device 40 placed between the gateway devices 20 and 21 and the application server 50 is omitted.

Figure 7:
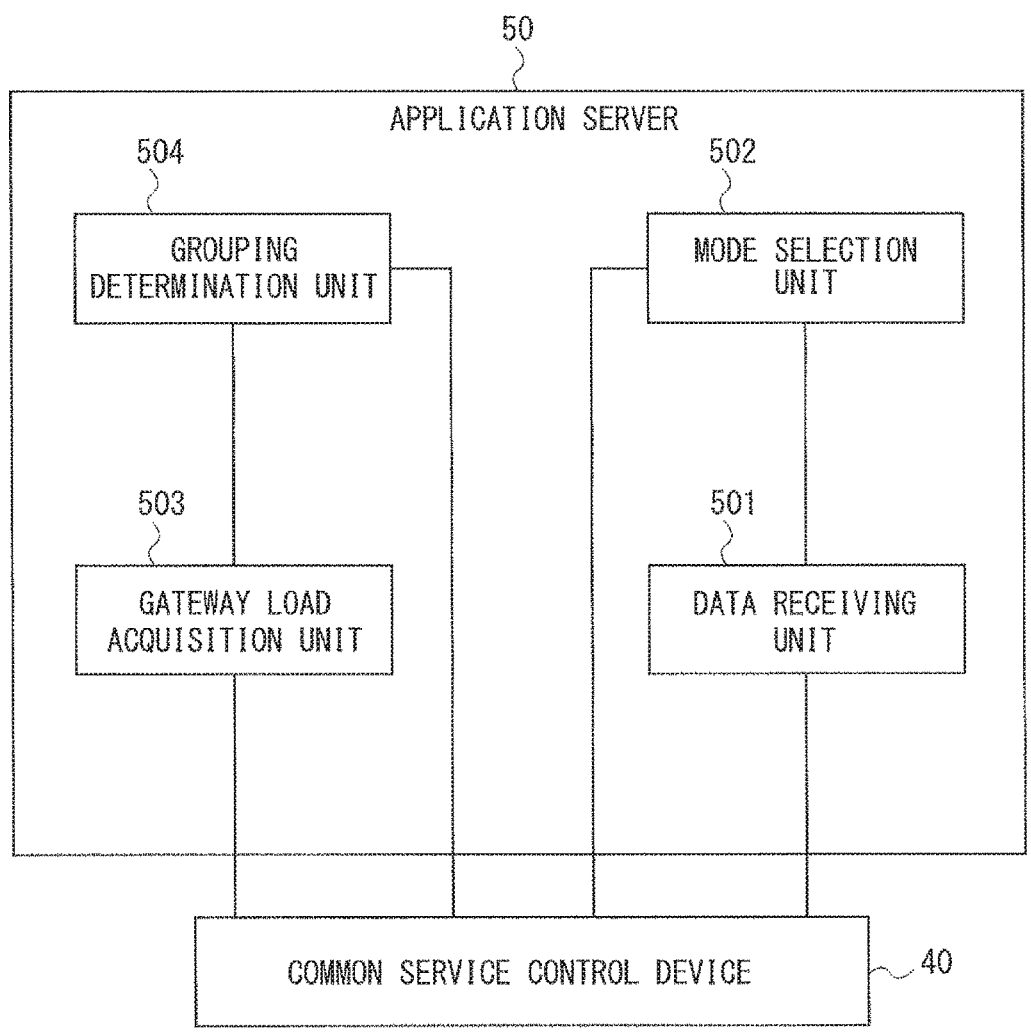
FIG. 7 is a block diagram of an application server according to the second exemplary embodiment.

A configuration example of the application server 50 according to the second exemplary embodiment of the present invention is described hereinafter with reference to FIG. 7. The application servers 51 and 52 have the same configuration as the application server 50, and detailed description thereof is omitted.

The application server 50 includes a data receiving unit 501, a mode selection unit 502, a gateway load acquisition unit 503, and a grouping determination unit 504. The application server 50 receives data transmitted from each of devices through the common service control device 40, the gateway device 20 or 21. At this time, the data receiving unit 501 of the application server 50 receives data transmitted from each device. Specified processing is performed on the received data inside the application server 50. The application server 50 may be a computer device that operates when a processor executes a program stored in a memory. Further, the data receiving unit 501, the mode selection unit 502, the gateway load acquisition unit 503 and the grouping determination unit 504 may be software, modules or the like processed when a processor executes a program stored in a memory. Further, the data receiving unit 501, the mode selection unit 502, the gateway load acquisition unit 503 and the grouping determination unit 504 may be configured by hardware such as a circuit or a chip.

At this time, the mode selection unit 502 verifies whether there is an abnormality in the received data. For example, the mode selection unit 502 makes verification based on whether data received in the past and data received at this time have a correlation or not. Alternatively, the mode selection unit 502 may prepare a specified threshold and determine whether there is an abnormality or not by comparison with the threshold. When the mode selection unit 502 determines that there is an abnormality in the received data, it sets the device that has detected the abnormal data to the detailed observation mode through the common service control device 40 and the gateway device 20 or 21. When the mode selection unit 502 determines that there is no abnormality, it maintains the normal observation mode. Further, when the mode selection unit 502 detects an abnormality in some device, it sets nearby devices also to the detailed observation mode. The abnormality detection operation that detects whether there is an abnormality in data and the operation that changes the operating mode of the device that has detected an abnormality may be performed by the device or the gateway device. Further, a change of the operating mode of devices near the device that has detected an abnormality may be made by the application server 50 or the common service control device 40.

The gateway load acquisition unit 503 acquires information about the load of each gateway device. In addition to processing load information of each gateway device at the present time, it acquires information as to which devices each gateway device is connected to and information as to whether those devices are in the normal observation mode or in the detailed observation mode. The gateway load acquisition unit 503 outputs the acquired information about the load of each gateway device to the grouping determination unit 504.

Using the information output from the gateway load acquisition unit 503, the grouping determination unit 504 determines grouping of devices so that the loads of the gateway devices become substantially equal. Stated differently, the grouping determination unit 504 determines into which gateway device each device is to be accommodated.

For example, the grouping determination unit 504 determines whether a difference in the loads between the gateway device 20 and the gateway device 21 exceeds a predetermined threshold (which is referred to as a first threshold) or not. When a difference in the loads between the gateway device 20 and the gateway device 21 exceeds the first threshold, the grouping determination unit 504 determines grouping of devices so as to reduce a difference in the loads between the gateway device 20 and the gateway device 21. For example, the grouping determination unit 504 determines grouping of devices so that a difference in the loads between the gateway device 20 and the gateway device 21 becomes equal to or less than a predetermined threshold (which is referred to as a second threshold). The second threshold is a value that is equal to or less than the first threshold.

After determining grouping of devices, the grouping determination unit 504 may notify all of the devices 10 to 17 of the identifier of the gateway device to which they are to be connected. For example, the grouping determination unit 504 adds the identifier of the gateway device to a common notification indicating a change and transmits it to the devices 10 to 17. In this case, when the identifier of the gateway device that is different from the gateway device to which they are currently connected is notified, the devices 10 to 17 change the gateway device to which they are connected. When, on the other hand, the identifier of the gateway device that is the same as the gateway device to which they are currently connected is notified, the devices 10 to 17 maintain the current connections.

Alternatively, after determining grouping of devices, the grouping determination unit 504 may notify only the devices which need to change the gateway device to which they are connected of the identifier of the gateway device after change. In this case, when the devices receive information about the identifier of the gateway device transmitted from the application server 50, they change the gateway device to which they are connected. For example, when the devices receive a notification, they may disconnect connections with the gateway device to which they have been connected and try to connect to the gateway device after change by using the received identifier.

Figure 8:
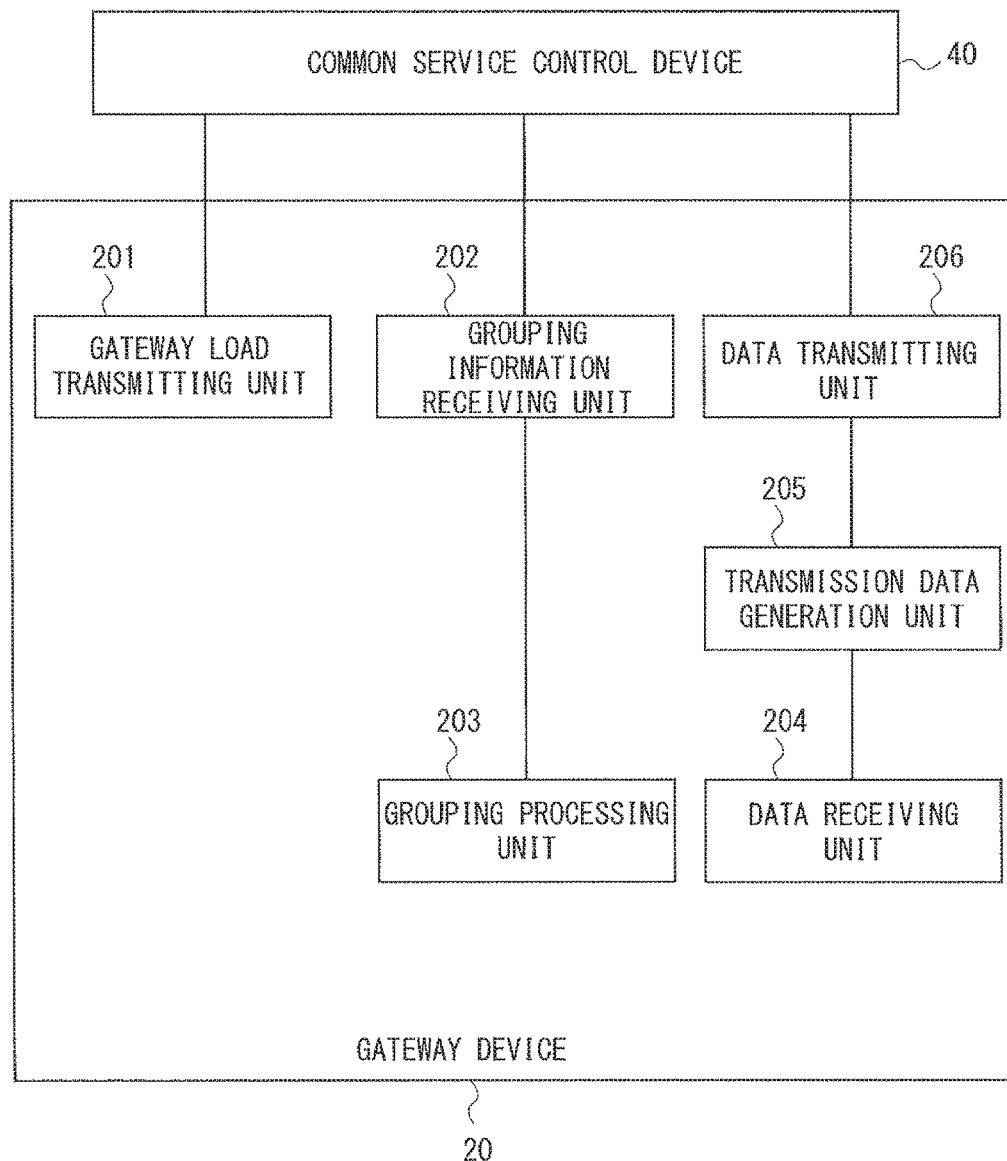
FIG. 8 is a block diagram of a gateway device according to the second exemplary embodiment.

A configuration example of the gateway device 20 according to the second exemplary embodiment of the present invention is described hereinafter with reference to FIG. 8. The gateway device 21 has the same configuration as the gateway device 20, and detailed description thereof is omitted.

The gateway device 20 includes a gateway load transmitting unit 201, a grouping information receiving unit 202, a grouping processing unit 203, a data receiving unit 204, a transmission data generation unit 205 and a data transmitting unit 206. The gateway device 20 may be a computer device that operates when a processor executes a program stored in a memory. Further, the gateway load transmitting unit 201, the grouping information receiving unit 202, the grouping processing unit 203, the data receiving unit 204, the transmission data generation unit 205 and the data transmitting unit 206 may be software, modules or the like processed when a processor executes a program stored in a memory. Further, the gateway load transmitting unit 201, the grouping information receiving unit 202, the grouping processing unit 203, the data receiving unit 204, the transmission data generation unit 205 and the data transmitting unit 206 may be configured by hardware such as a circuit or a chip.

The gateway load transmitting unit 201 transmits information about the load of the gateway device 20 that varies depending on the number of devices connected thereto to the application server 50 through the common service control device 40. The information about the load may be a CPU (Central Processing Unit) usage rate in the gateway device 20, the amount of data transmitted from devices or the like, for example. Alternatively, the information about the load may be information about the number of devices connected to the gateway device 20 and set to the normal observation mode or the number of those devices set to the detailed observation mode. Alternatively, the information about the load may be information about the communication frequency in the gateway device 20.

The grouping information receiving unit 202 receives information about grouping of devices transmitted from the common service control device 40. The information about grouping is information that specifies a group to which each device belongs, for example. The information about grouping may be information that specifies devices which belong to the first group and devices which belong to the second group. In other words, the grouping information receiving unit 202 may receive not only information about devices that belong to the first group but also information about devices that belong to the second group. The gateway device 20 communicates with the devices that belong to the first group.

By using the information about grouping received by the grouping information receiving unit 202, the grouping processing unit 203 notifies the devices that belong to the first group of the identifier of the gateway device 20. In this case, the devices that receive the identifier of the gateway device 20 connect to the gateway device 20. Alternatively, the grouping processing unit 203 may notify the devices that are currently connected of the information about grouping and the identifier of the gateway device 20. In this case, each of the devices recognizes the group to which it belongs and connects to the gateway device which the group to which it belongs should be connected to. When the identifier of the gateway device that is different from the gateway device to which it is currently connected is notified, the device changes the gateway device to which it is connected. When, on the other hand, the identifier of the gateway device that is the same as the gateway device to which it is currently connected is notified, the device maintains the current connection.

The data receiving unit 204 receives the data transmitted from each of the devices that are connected to the gateway device 20. The data receiving unit 204 outputs the received data to the transmission data generation unit 205.

The transmission data generation unit 205 puts the data transmitted from each of the devices into one packet data, for example, and thereby generates transmission data to be transmitted to the common service control device 40. At this time, when the packet length exceeds the maximum size, the transmission data generation unit 205 may divide the transmission data into a plurality of packet data. The transmission data generation unit 205 transmits the generated transmission data to the data transmitting unit 206. The data transmitting unit 206 outputs the transmission data output from the transmission data generation unit 205 to the common service control device 40.

Figure 9:
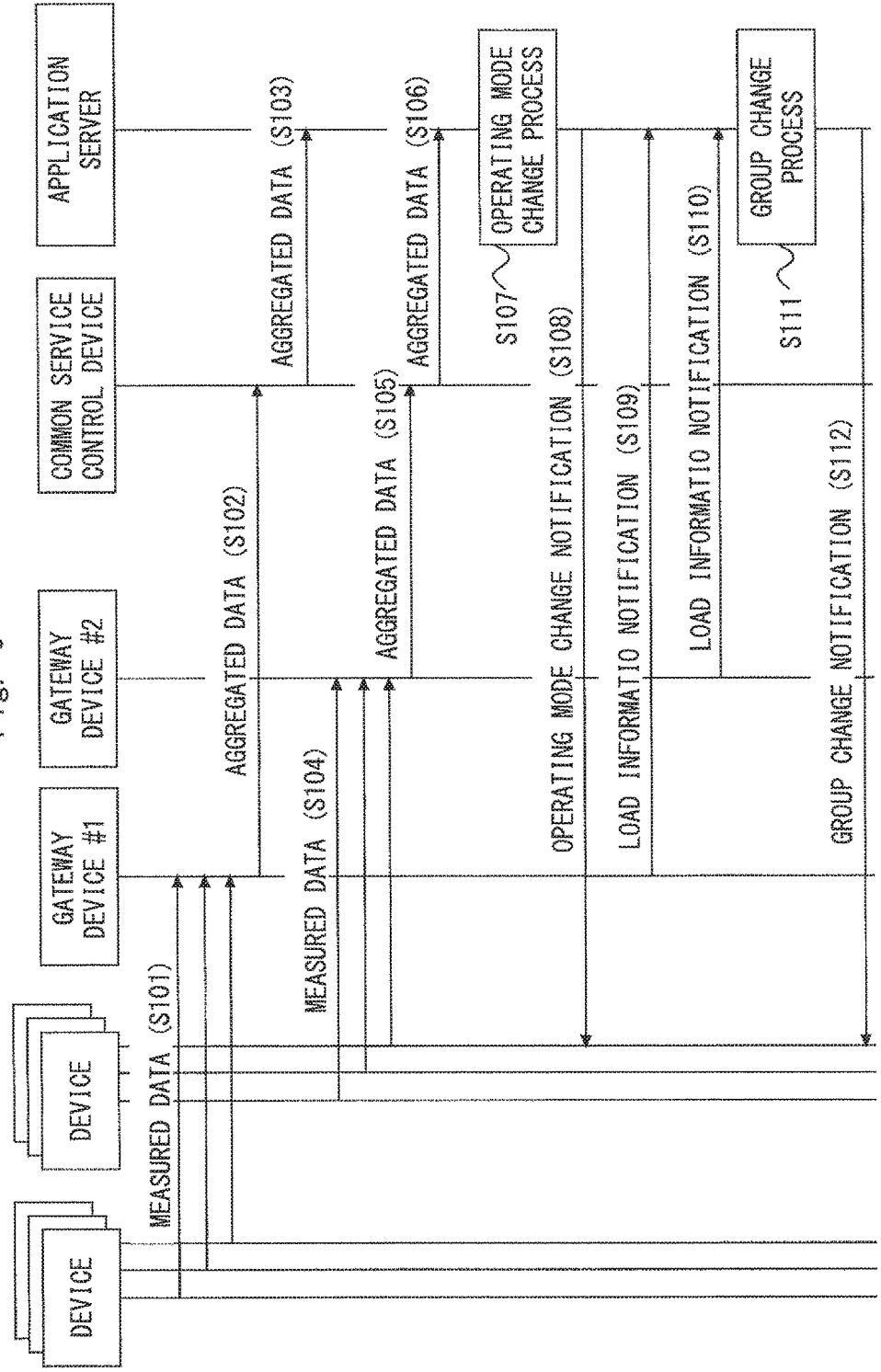
FIG. 9 is a view illustrating the operation of the communication aggregation system according to the second exemplary embodiment.

The operation in the communication aggregation system according to the second exemplary embodiment of the invention is described hereinafter with reference to FIG. 9. First, the devices that belong to the first group transmit data that have been measured, observed or the like (S101). Next, the gateway device 20 aggregates the data transmitted from the devices that belong to the first group. The gateway device 20 transmits the aggregated data to the common service control device 40 (S102). Then, the common service control device 40 transmits the data transmitted from the gateway device 20 to the application server 50 (S103). The data measured by the devices that belong to the second group is also transmitted to the application server 50 in Steps S104 to S106 in the same manner as the data measured by the devices that belong to the first group.

Then, the application server 50 performs a device operating mode change process (S107). The device operating mode change process determines whether the received data is abnormal or not and changes the operating mode of a device that has transmitted abnormal data and devices placed nearby. After the application server 50 specifies the devices whose operating mode is to be changed, it transmits an operating mode change notification message to the specified devices (S108).

Then, the application server 50 acquires load information from the gateway device 20 and the gateway device 21 (S109, S110).

Then, the application server 50 performs a group change process by using the load information acquired from the gateway device 20 and the gateway device 21 (S110). The application server 50 then transmits a group change notification message to the devices whose group is to be changed (S112).

The messages in Steps S108 and S112 may be sent only to target devices or transmitted to all devices.

Note that the operations in Steps S107 and S108 and Steps S111 and S112 in this figure may be performed at the same time. Further, the processing related to a change of the group in Steps S111 and S112 may be performed before the processing related to a change of the operating mode in Steps S107 and S108.

Further, the application server 50 may determine the load of the gateway devices by using the aggregated data acquired in Steps S103 and S106, instead of acquiring the load information of the gateway devices in Steps S109 and S110, and determine grouping of the devices.

The flow of the operating mode change process and the group change process in the application server 50 according to the second exemplary embodiment of the invention is described hereinafter with reference to FIG. 10. First, the data receiving unit 501 receives data transmitted from each of devices (S11). Next, the mode selection unit 502 determines whether the data received by the data receiving unit 501 indicates an abnormality or not (S12). For example, the mode selection unit 502 makes determination based on whether data received in the past and data received at this time have a correlation or not. When the mode selection unit 502 determines that the received data does not indicate an abnormality, the process ends.

On the other hand, when the mode selection unit 502 determines that the received data indicates an abnormality, it specifies the devices whose operating mode is to be changed (S13). A change of the operating mode is a change from the normal observation mode to the detailed observation mode, for example. The devices whose operating mode is to be changed are a device that has transmitted data indicating an abnormality and devices placed close to that device.

Then, the mode selection unit 502 notifies the devices whose operating mode is to be changed that the operating mode is to be changed from the normal observation mode to the detailed observation mode (S14). The gateway load acquisition unit 503 then acquires the load information from the gateway devices 20 and 21 (S15). The grouping determination unit 504 then determines whether a difference in the loads between the gateway device 20 and the gateway device 21 exceeds a first threshold or not (S16). When the grouping determination unit 504 determines that a difference in the loads is below the first threshold, the process ends.

On the other hand, when the grouping determination unit 504 determines that a difference in the loads exceeds the first threshold, it changes a group which the devices belong to (S17). For example, the grouping determination unit 504 changes a group which the devices belong to so that the loads of the gateway devices 20 and 21 are substantially equal. Then, the grouping determination unit 504 notifies each device of group information (S18).

As described above, by using the application server 50 according to the second exemplary embodiment of the invention, it is possible to change a group which devices belong to. Stated differently, the application server 50 can change a gateway device which devices are connected to in such a way that the devices with a high data transmission frequency belong to different gateway devices. Therefore, it is possible to reduce the maximum throughput capacity and the channel capacity required for a gateway device compared with the case where grouping of devices is fixed.

Third Exemplary Embodiment

Figure 11:
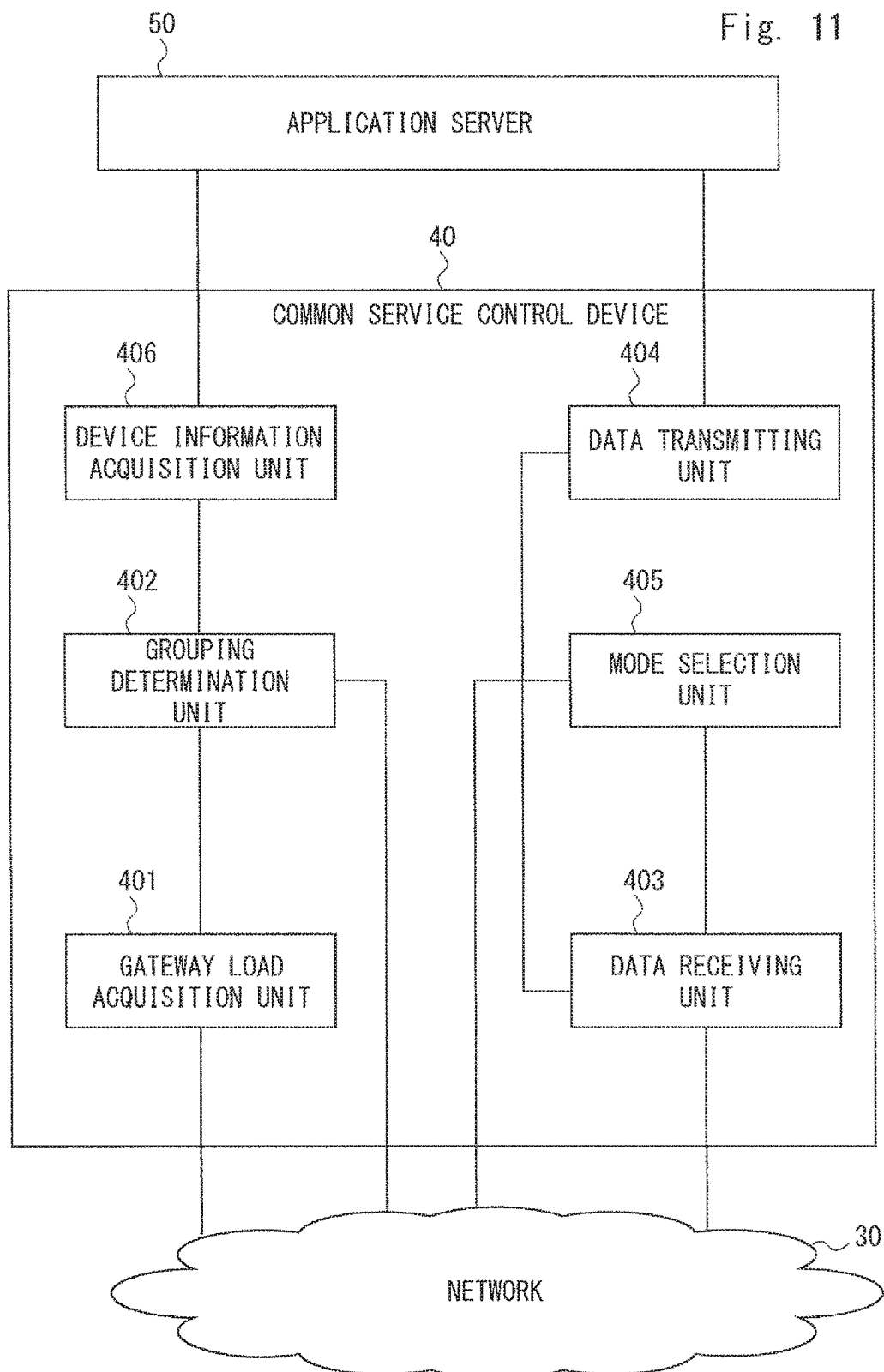
FIG. 11 is a block diagram of a common service control device according to a third exemplary embodiment.

A configuration example of a common service control device 40 according to a third exemplary embodiment of the invention is described hereinafter with reference to FIG. 11. In this exemplary embodiment, the common service control device 40 acquires necessary information from the application server 50 and determines grouping.

The common service control device 40 includes a gateway load acquisition unit 401, a grouping determination unit 402, a data receiving unit 403, a data transmitting unit 404, a mode selection unit 405 and a device information acquisition unit 406. The common service control device 40 may be a computer device that operates when a processor executes a program stored in a memory. Further, the gateway load acquisition unit 401, the grouping determination unit 402, the data receiving unit 403, the data transmitting unit 404, the mode selection unit 405 and the device information acquisition unit 406 may be software, modules or the like processed when a processor executes a program stored in a memory. Further, the gateway load acquisition unit 401, the grouping determination unit 402, the data receiving unit 403, the data transmitting unit 404, the mode selection unit 405 and the device information acquisition unit 406 may be configured by hardware such as a circuit or a chip.

The application server 50 receives data transmitted from each of devices through the common service control device 40 and the gateway device 20 or 21. At this time, in the common service control device 40, the data receiving unit 403 receives data transmitted from each of devices. The data receiving unit 403 outputs the received data to the data transmitting unit 404. The data transmitting unit 404 transmits the data output from the data receiving unit 403 to the application server 50.

The application server 50 evaluates the presence or absence of an abnormality in data, and determines the operating mode of a device that has generated the data and nearby devices. The device information acquisition unit 406 in the common service control device 40 acquires information about the operating mode (the normal observation mode or the normal observation mode) of each device from the application server 50.

The gateway load acquisition unit 401 acquires information about the loads of the gateway devices 20 and 21. In addition go the processing load information of each gateway device at the present time, the gateway load acquisition unit 401 acquires which devices each gateway device is handling.

By using the information acquired by the gateway load acquisition unit 401 and the device operating mode information acquired by the device information acquisition unit 406, the grouping determination unit 402 determines grouping of devices so that the loads of the gateway devices become substantially equal. The grouping of devices is to determine into which gateway device each device is to be accommodated.

As described above, the common service control device 40 according to the third exemplary embodiment of the invention can determine the grouping of devices so that the loads of the gateway devices become substantially equal. Therefore, a plurality of application servers connected to the common service control device 40 do not need to have a function for determining the grouping of devices. Thus, the configuration of the application servers can be simple.

Fourth Exemplary Embodiment

Figure 12:
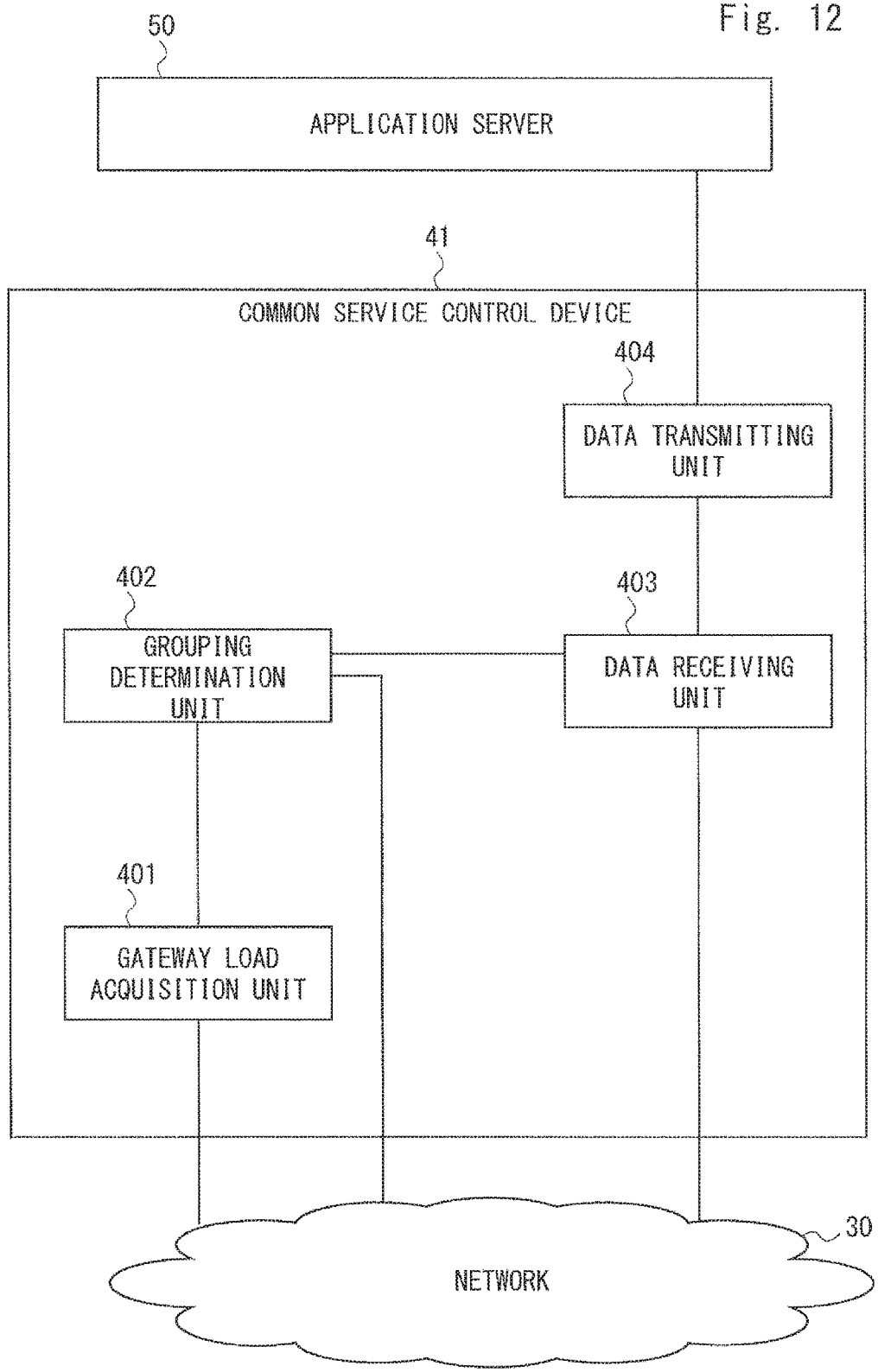
FIG. 12 is a block diagram of a common service control device according to a fourth exemplary embodiment.

A configuration example of a common service control device 41 according to a fourth exemplary embodiment of the invention is described hereinafter with reference to FIG. 12. In the fourth exemplary embodiment, the common service control device 41 determines the grouping without provision of information from the application server 50.

The common service control device 41 includes a gateway load acquisition unit 401, a grouping determination unit 402, a data receiving unit 403, a data transmitting unit 404 and a mode selection unit 405.

The application server 50 receives data from each of devices through the common service control device 41 and the gateway device 20 or 21. At this time, in the common service control device 41, the data receiving unit 403 receives data from each of devices. The data receiving unit 403 outputs the received data to the data transmitting unit 404. The data transmitting unit 404 transmits the data output from the data receiving unit 403 to the application server 50. At this time, the data receiving unit 403 notifies the grouping determination unit 402 of the frequency of data reception.

The gateway load acquisition unit 401 acquires information about the load of each gateway device. In addition to the processing load information of each gateway device at the present time, the gateway load acquisition unit 401 acquires which devices each gateway device is handling. By using the information acquired by the gateway load acquisition unit 401 and the data reception frequency obtained from the data receiving unit 403, the grouping determination unit 402 determines grouping of devices (accommodation of each device into a gateway device) so that the loads of the gateway devices become substantially equal. In this case, the grouping determination unit 402 determines grouping of devices so that the data reception frequencies in the gateway devices become substantially equal.

As described above, the common service control device 41 according to the fourth exemplary embodiment can determine the optimum grouping of a plurality of devices by using the data reception frequency information without obtaining information as to whether each device is in normal observation mode or in the detailed observation mode. Therefore, the common service control device 41 can have a simple configuration compared with the common service control device 40 in FIG. 11.

Fifth Exemplary Embodiment

An operation according to a fifth exemplary embodiment is described hereinafter. In the above-described exemplary embodiments, an example where the amount of data increases with a change in the operating mode is described. In this exemplary embodiment, an example where the amount of data increases without a change in the operating mode is described.

For example, there are cases where the amount of data transmitted per unit time from a device is not uniform. To be specific, a device that is used as a sensor transmits waveform data per unit time in some cases. In such a case, the amount of data transmission varies depending on the waveform. Further, when the waveform in the event of an abnormality is complicated, the amount of data transmission increases. In this manner, there is a case where the amount of data transmitted from a device that has detected an abnormality increases even when the application server 50 or the like does not change the operating mode.

Figure 10:
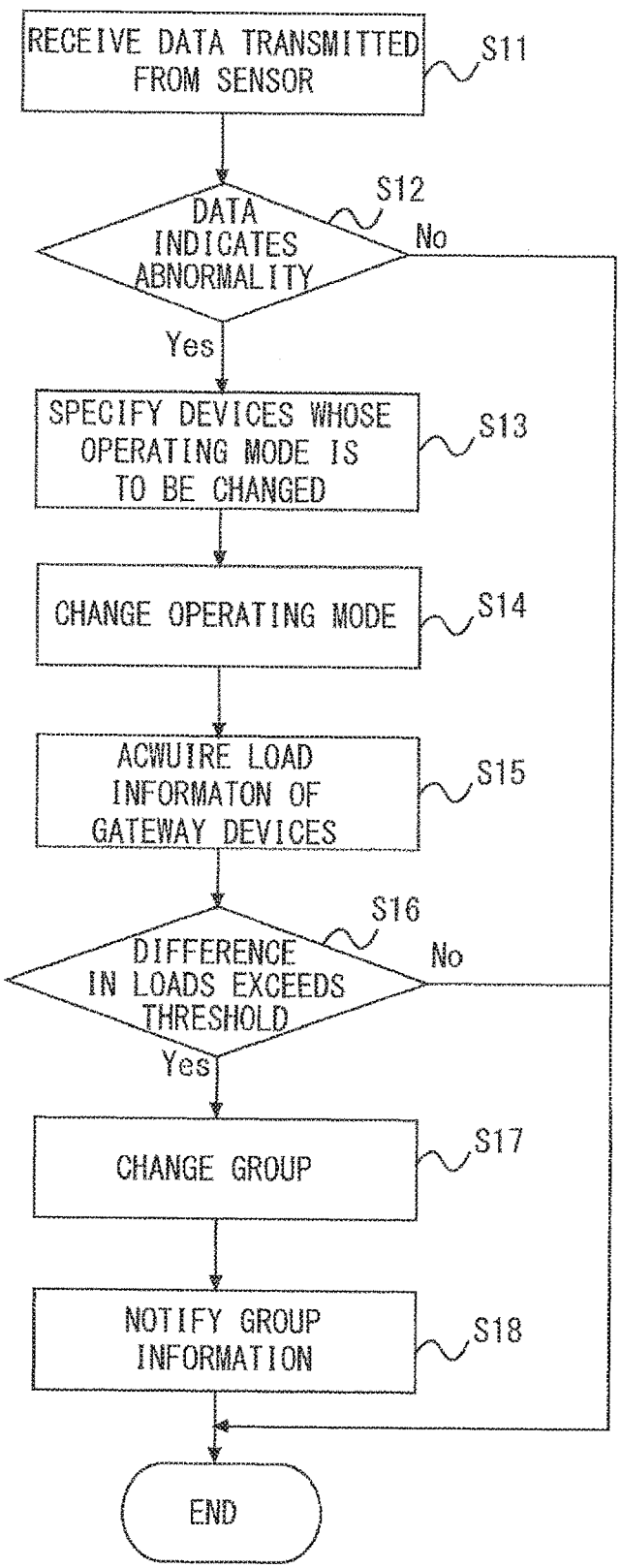
FIG. 10 is a view showing the flow of a group change process according to the second exemplary embodiment.

In this case, instead of performing the processing of specifying devices whose operating mode is to be changed and changing the operating mode in Steps S13 and S14 in FIG. 10, the common service control device 40 may perform the processing of specifying a device where the amount of data increases.

Figure 13:
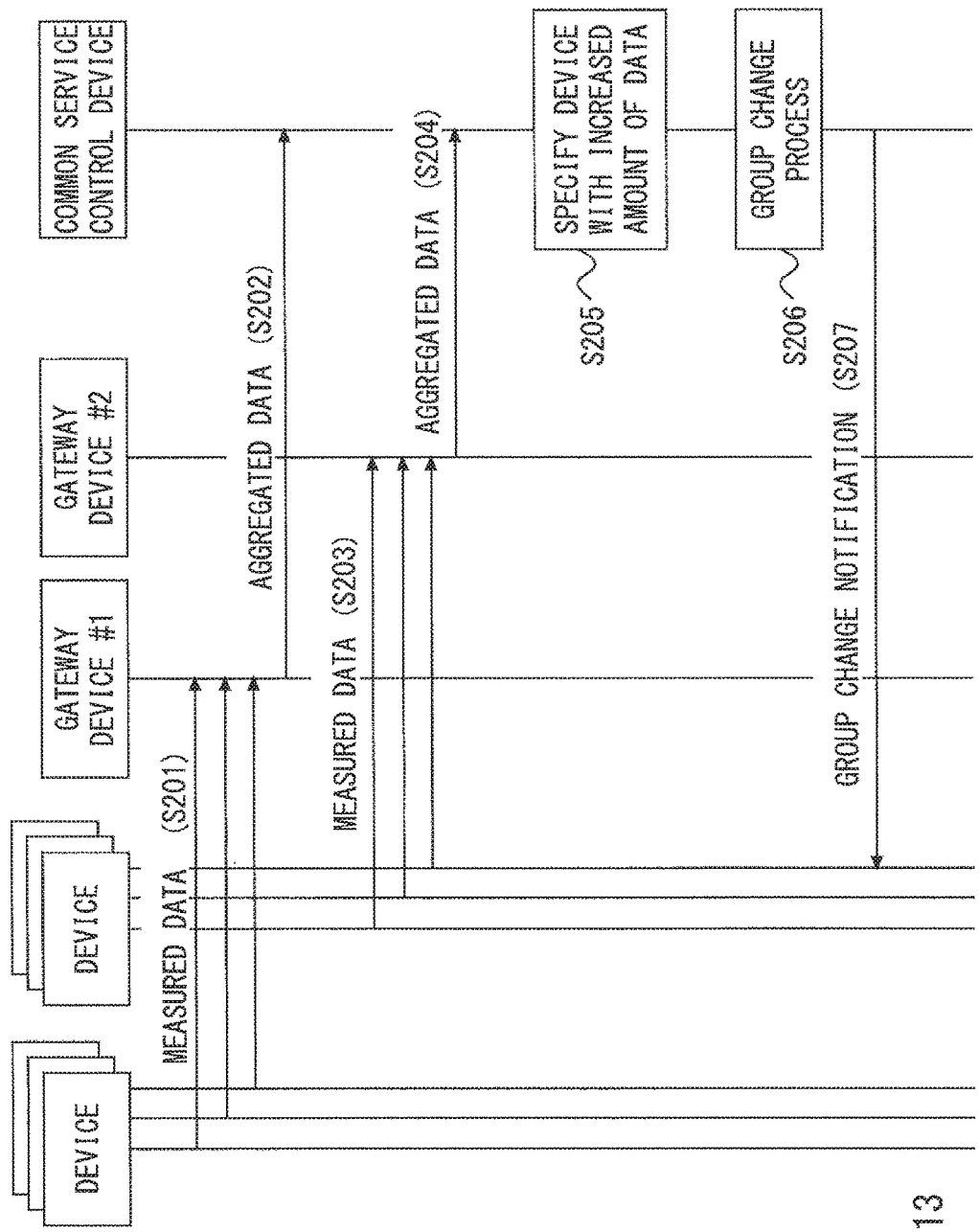
FIG. 13 is a view showing the flow of a group change process according to a fifth exemplary embodiment.

The flow of the process of specifying a device where the amount of data increases is described hereinafter with reference to FIG. 13. Steps S201 and S202 are the same as Steps S101 and S102 in FIG. 9, and therefore detailed explanation thereof is omitted. Further, Steps S203 and S204 are the same as Steps S104 and S105 in FIG. 9, and therefore detailed explanation thereof is omitted.

The common service control device 40 receives the aggregated data transmitted from the gateway device in Steps S202 and S204 and specifies a device where the amount of data transmission increases (S205). Then, the common service control device 40 determines grouping of devices so that the loads of the gateway devices become substantially equal (S206). To be specific, the common service control device 40 determines grouping of devices so that the amounts of data transmission in the gateway devices become substantially equal.

Next, the common service control device 40 transmits a group change notification message to the devices whose group is to be changed (S207).

As described above, the application server 50 or the like can detect an increase in the amount of data transmitted from devices even when a change in the operating mode is not made. Therefore, the application server 50 or the like can control the loads of the gateway device 20 and the gateway device 21 by changing the group of devices or the like in accordance with the amount of data transmitted from devices.

Although the present invention is described as a hardware configuration in the above exemplary embodiments, the present invention is not limited thereto. The present invention may be implemented by causing a CPU (Central Processing Unit) to execute a computer program to perform the processing in the application servers 50 to 52, the common service control device 40 and the common service control device 41.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described exemplary embodiment and may be varied in many ways within the scope of the present invention.

For example, the whole or part of the exemplary embodiments disclosed above can be described as, but not limited to, the following supplementary notes.

(Supplementary note 1) A communication aggregation system comprising; a plurality of devices; a first gateway device that communicates with devices included in a first group out of the plurality of devices; a second gateway device that communicates with devices included in a second group out of the plurality of devices; and a control means for, when the amount of data transmitted from some device out of the plurality of devices increases and a difference in processing loads between the first gateway device and the second gateway device is greater than a first threshold, changing a group to which at least one device out of the plurality of devices belongs so that a difference in the processing loads becomes equal to or less than a second threshold being a value equal to or less than the first threshold.

(Supplementary note 2) The communication aggregation system according to Supplementary note 1, wherein the control means changes a group to which at least one device out of the plurality of devices belongs so that the processing loads in the first gateway device and the second gateway device become substantially equal.

(Supplementary note 3) The communication aggregation system according to Supplementary note 1, wherein the control means changes a group to which at least one device out of the plurality of devices belongs so that data reception frequencies in the first gateway device and the second gateway device become substantially equal.

(Supplementary note 4) The communication aggregation system according to any one of Supplementary notes 1 to 3, wherein, when an abnormality is found in data transmitted from some device out of the plurality of devices, the control means changes an operating mode of the device from normal observation mode to detailed observation mode and further changes an operating mode of nearby devices with a high degree of correlation with the device from normal observation mode to detailed observation mode.

(Supplementary note 5) The communication aggregation system according to any one of Supplementary notes 1 to 4, further comprising: an application server that provides application services by using data transmitted from the plurality of devices; and a common service control device located between a plurality of gateway devices and the application server, wherein the control means is included in the application server or the common service control device.

(Supplementary note 6) A control device that connects a first gateway device that communicates with devices included in a first group out of a plurality of devices and a second gateway device that communicates with devices included in a second group out of the plurality of devices, comprising: a gateway load acquisition unit that acquires load information from the first gateway device and the second gateway device; and a grouping determination unit that, when the amount of data transmitted from some device out of the plurality of devices increases and a difference in processing loads between the first gateway device and the second gateway device is greater than a first threshold, changes a group to which at least one device out of the plurality of devices belongs so that a difference in the processing loads becomes equal to or less than a second threshold being a value equal to or less than the first threshold.

(Supplementary note 7) The control device according to Supplementary note 6, wherein the grouping determination unit changes a group to which at least one device out of the plurality of devices belongs so that the processing loads in the first gateway device and the second gateway device become substantially equal.

(Supplementary note 8) The control device according to Supplementary note 7, wherein the grouping determination unit changes a group to which at least one device out of the plurality of devices belongs so that data reception frequencies in the first gateway device and the second gateway device become substantially equal.

(Supplementary note 9) The control device according to any one of Supplementary notes 6 to 8, wherein, when an abnormality is found in data transmitted from some device out of the plurality of devices, the grouping determination unit changes an operating mode of the device from normal observation mode to detailed observation mode and further changes an operating mode of nearby devices with a high degree of correlation with the device from normal observation mode to detailed observation mode.

(Supplementary note 10) A processing load control method comprising: acquiring load information from a first gateway device that communicates with devices included in a first group out of a plurality of devices and a second gateway device that communicates with devices included in a second group out of the plurality of devices; and when the amount of data transmitted from some device out of the plurality of devices increases and a difference in processing loads between the first gateway device and the second gateway device is greater than a first threshold, changing a group to which at least one device out of the plurality of devices belongs so that a difference in the processing loads becomes equal to or less than a second threshold being a value equal to or less than the first threshold.

(Supplementary note 11) A program causing a computer to execute: acquiring load information from a first gateway device that communicates with devices included in a first group out of a plurality of devices and a second gateway device that communicates with devices included in a second group out of the plurality of devices; and when the amount of data transmitted from some device out of the plurality of devices increases and a difference in processing loads between the first gateway device and the second gateway device is greater than a first threshold, changing a group to which at least one device out of the plurality of devices belongs so that a difference in the processing loads becomes equal to or less than a second threshold being a value equal to or less than the first threshold.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-206187 filed on Oct. 7, 2014, the disclosure of which is incorporated herein in its entirety by reference.

REFERENCE SIGNS LIST

1 GATEWAY DEVICE
2 GATEWAY DEVICE
3 DEVICE
4 DEVICE
5 DEVICE
6 DEVICE
7 CONTROL DEVICE
10-13 DEVICE
14-17 DEVICE
20 GATEWAY DEVICE
21 GATEWAY DEVICE
30 NETWORK
40 COMMON SERVICE CONTROL DEVICE
41 COMMON SERVICE CONTROL DEVICE
50 APPLICATION SERVER
51-53 APPLICATION SERVER
201 GATEWAY LOAD TRANSMITTING UNIT
202 GROUPING INFORMATION RECEIVING UNIT
203 GROUPING PROCESSING UNIT
204 DATA RECEIVING UNIT
205 TRANSMISSION DATA GENERATION UNIT
206 DATA TRANSMITTING UNIT
401 GATEWAY LOAD ACQUISITION UNIT
402 GROUPING DETERMINATION UNIT
403 DATA RECEIVING UNIT
404 DATA TRANSMITTING UNIT
405 MODE SELECTION UNIT
406 DEVICE INFORMATION ACQUISITION UNIT
501 DATA RECEIVING UNIT
502 MODE SELECTION UNIT
503 GATEWAY LOAD ACQUISITION UNIT
504 GROUPING DETERMINATION UNIT

The invention claimed is:
1. A communication aggregation system comprising:
a plurality of devices;
a first gateway device; and
a second gateway device; and
a control device;
wherein the first gateway device comprises:
  at least one memory storing instructions, and
  at least one processor configured to execute the instructions to
    communicate with devices included in a first group out of the plurality of devices;
wherein the second gateway device comprises:
  at least one memory storing instructions, and at least one processor configured to execute the instructions to:
: communicate with devices included in a second group out of the plurality of devices; and wherein the control device comprises:
: at least one memory storing instructions, and
: at least one processor configured to execute the instructions to:
:: change a group to which at least one device out of the plurality of devices belongs so that a difference in the processing loads becomes equal to or less than a second threshold being a value equal to or less than the first threshold when the amount of data transmitted from some device out of the plurality of devices increases and a difference in processing loads between the first gateway device and the second gateway device is greater than a first threshold; and
:: when an abnormality is found in data transmitted from some device out of the plurality of devices, change an operating mode of the device from normal observation mode to detailed observation mode and further changes an operating mode of nearby devices with a high degree of correlation with the device from normal observation mode to detailed observation mode.

2. The communication aggregation system according to claim 1, wherein the at least one processor of the control device is further configured to execute the instructions to change a group to which at least one device out of the plurality of devices belongs so that the processing loads in the first gateway device and the second gateway device become substantially equal.

3. The communication aggregation system according to claim 1, wherein the at least one processor of the control device is further configured to execute the instructions to change a group to which at least one device out of the plurality of devices belongs so that data reception frequencies in the first gateway device and the second gateway device become substantially equal.

4. The communication aggregation system according to claim 1, further comprising:
: an application server that provides application services by using data transmitted from the plurality of devices; and
: a common service control device located between a plurality of gateway devices and the application server, wherein
: the control device is included in the application server or the common service control device.

5. A control device that connects a first gateway device that communicates with devices included in a first group out of a plurality of devices and a second gateway device that communicates with devices included in a second group out of the plurality of devices, comprising:
: at least one memory storing instructions, and
: at least one processor configured to execute the instructions to:
:: acquire load information from the first gateway device and the second gateway device;
:: change a group to which at least one device out of the plurality of devices belongs so that a difference in the processing loads becomes equal to or less than a second threshold being a value equal to or less than the first threshold when the amount of data transmitted from some device out of the plurality of devices increases and a difference in processing loads between the first gateway device and the second gateway device is greater than a first threshold; and
:: when an abnormality is found in data transmitted from some device out of the plurality of devices, change an operating mode of the device from normal observation mode to detailed observation mode and further changes an operating mode of nearby devices with a high degree of correlation with the device from normal observation mode to detailed observation mode.

6. The control device according to claim 5, wherein the at least one processor is further configured to execute the instructions to change a group to which at least one device out of the plurality of devices belongs so that the processing loads in the first gateway device and the second gateway device become substantially equal.

7. The control device according to claim 6, wherein the at least one processor is further configured to execute the instructions to change a group to which at least one device out of the plurality of devices belongs so that data reception frequencies in the first gateway device and the second gateway device become substantially equal.

8. A processing load control method comprising:
: acquiring load information from a first gateway device that communicates with devices included in a first group out of a plurality of devices and a second gateway device that communicates with devices included in a second group out of the plurality of devices;
: when the amount of data transmitted from some device out of the plurality of devices increases and a difference in processing loads between the first gateway device and the second gateway device is greater than a first threshold, changing a group to which at least one device out of the plurality of devices belongs so that a difference in the processing loads becomes equal to or less than a second threshold being a value equal to or less than the first threshold; and
: when an abnormality is found in data transmitted from some device out of the plurality of devices, change an operating mode of the device from normal observation mode to detailed observation mode and further changes an operating mode of nearby devices with a high degree of correlation with the device from normal observation mode to detailed observation mode.

* * * * *